(No Model.)
T. CRAKES.
METHOD OF CULTIVATING FRUIT TREES.
No. 446,662. Patented Feb. 17, 1891.
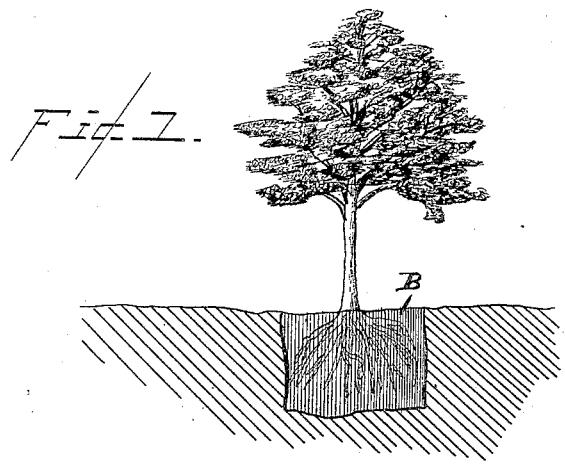
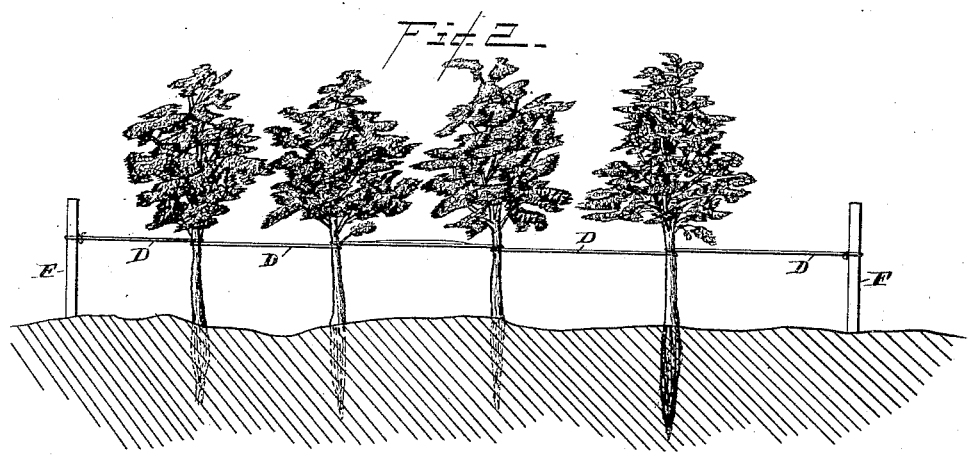
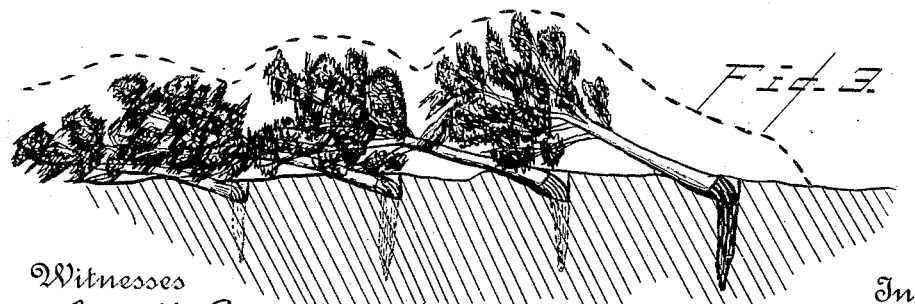

UNITED STATES PATENT OFFICE.

THOMAS CRAKES, OF MISHAWAKA, INDIANA.

METHOD OF CULTIVATING FRUIT-TREES.

SPECIFICATION forming part of Letters Patent No. 446,662, dated February 17, 1891.

Application filed August 8, 1890. Serial No. 361,440. (No model.)

*To all whom it may concern:*

Be it known that I, THOMAS CRAKES, of Mishawaka, in the county of St. Joseph and State of Indiana, have invented certain new and useful Improvements in Cultivating Fruit-Trees; and I do hereby declare that the following is a full, clear, and exact description thereof, reference being had to the accompanying drawings, and to the letters of reference marked thereon, which form part of this specification, in which—

Figure 1 illustrates the first step in my improved manner of planting and cultivating fruit-trees. Fig. 2 is a view of a row of such trees elevated for budding and fruiting. Fig. 3 illustrates the same lowered for protection in winter.

The present invention is an improvement in horticulture, and relates especially to fruit-raising; and its object is to enable a large number of sensitive fruit-trees to be reared during the warmer months, and then lowered during the cold weather until it is desired to have them bud again; and to this end it consists in the novel manner of planting and arranging the trees and in other novel details that are useful in the culture thereof, which will be fully understood from the following description and claims.

In planting an orchard the trees should be arranged in rows, and trees in the same row should be so near together that if laid down in the line of the row the top of the adjoining trees after they have attained a bearing growth would overlie the trunks and roots of the adjoining tree, as illustrated in Figs. 2 and 3.

In planting the trees a hole is dug having a flat vertical side B standing transversely to the line of the row of trees, and against this side B the roots of the tree being planted are pressed and flattened into fan form, then the dirt and earth are packed against the roots, so that when completed the roots of the tree will be in fan shape and in the same vertical transverse plane, instead of branching or diverging radially as is ordinarily the case. This necessitates the employment of braces to sustain the tree upright and prevent its falling over in the line of the row. All the trees are planted in this manner, and instead of employing separate braces for each I prefer to employ a chain rope or wire stay D, which is connected to a stake F at one end of the row, then to the first tree when stood upright, then to the others successively, and to a stake at the other end of the row, thus sustaining all the trees upright, their roots preventing their falling laterally of the row. The trees are thus sustained during the fruiting season, and when this is over the stays are loosened and the trees fall over in the line of the row, and being so near together the foliage of one tree overlies the roots and trunk of the adjoining tree, the foliage of the latter overlying the root and trunk of the next tree, and so on to the end of the row. In addition to the natural foliage, which will serve as a protector during the early frosts, I cover the entire row with straw, brush, &c., to protect the trees during more bitter weather, and in order to retard the budding and sapping of of the trees at the approach of spring the covering can be removed partially or entirely and the trees covered with snow, then the whole again re-covered by the straw and brush until it is safe and desirable to raise the trees; or sawdust may be used to protect or preserve the snow. If the trees do not fall readily in the line of the row because of offshoots from the roots, the earth can be dug away from the roots and the suckers cut off, keeping the roots only in one plane. By thus planting and cultivating the trees peaches, apricots, &c., can be cultivated in places where, owing to the severity of the climate or changeability of the early seasons, the buds would be killed by frost if cultivated in the ordinary manner.

I am aware that it has been proposed to plant single trees in pots or vessels of inverted-T form, so that they can be lowered in cold weather and covered. I do not claim this feature of lowering trees, broadly; but, Having described my invention, what I do claim as new, and desire to secure by Letters Patent thereon, is—

1. The herein-described method of cultivating fruit-trees, consisting in planting the trees in rows with the roots of the trees unconfined but caused to grow in a plane transversely of the line of the row and in such proximity to each other that when the trees are lowered in the line of the row the foliage of one tree will overlie the roots of the adjoining and succeeding tree in the row, substantially as and for the purpose set forth.

2. The herein-described method of cultivating fruit-trees, consisting in planting the trees in rows in such manner that their roots will lie in vertical planes or fan form transversely to the line of the rows, and in such proximity that when one tree is lowered in the line of the row its foliage will overlie the roots and trunk of the adjoining tree in the same row, raising the trees and sustaining them by stays during the fruiting season and lowering and covering them during the winter season, substantially as described.

In testimony that I claim the foregoing as my own I affix my signature in presence of two witnesses.

THOMAS CRAKES.

Witnesses:
JAMES DUSHANE,
WILL G. GRABILL.